Oct. 8, 1963  G. GERARD ETAL  3,105,994
PRESSURE APPARATUS
Filed Aug. 13, 1959  5 Sheets-Sheet 1
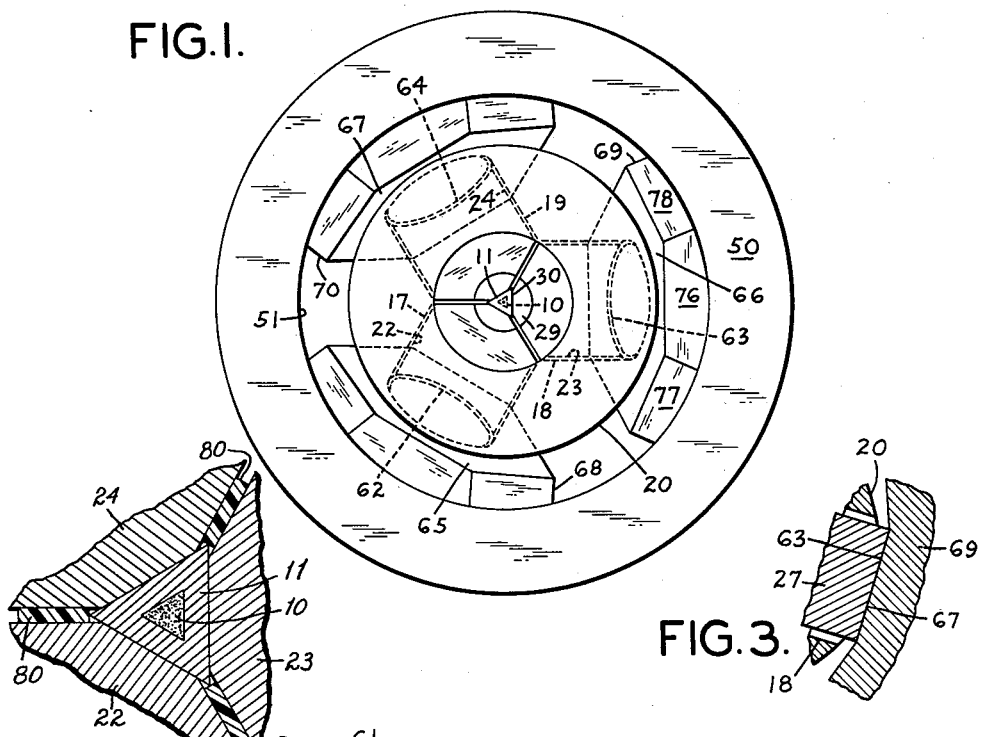
FIG. 1.
FIG. 3.
FIG. 12.
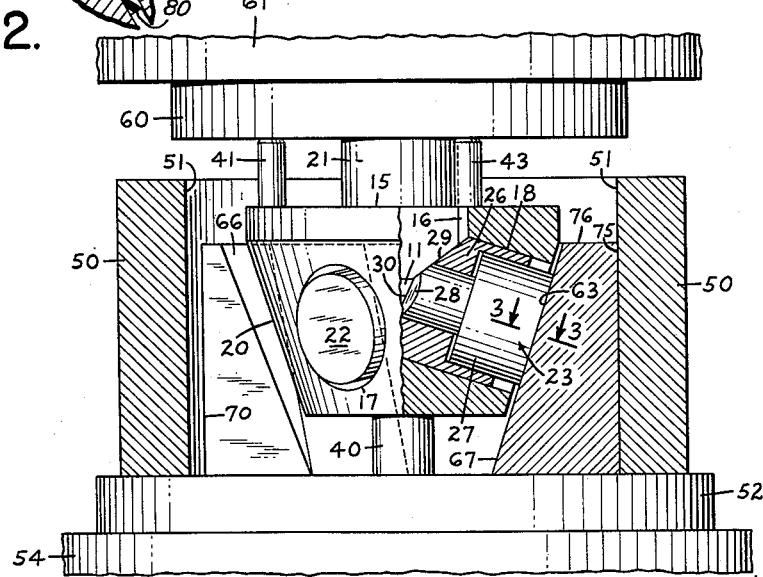
FIG. 2.
INVENTORS
GEORGE GERARD
JACOB BRAYMAN
BY Brumbaugh,
Free, Graves + Donohue
THEIR ATTORNEYS

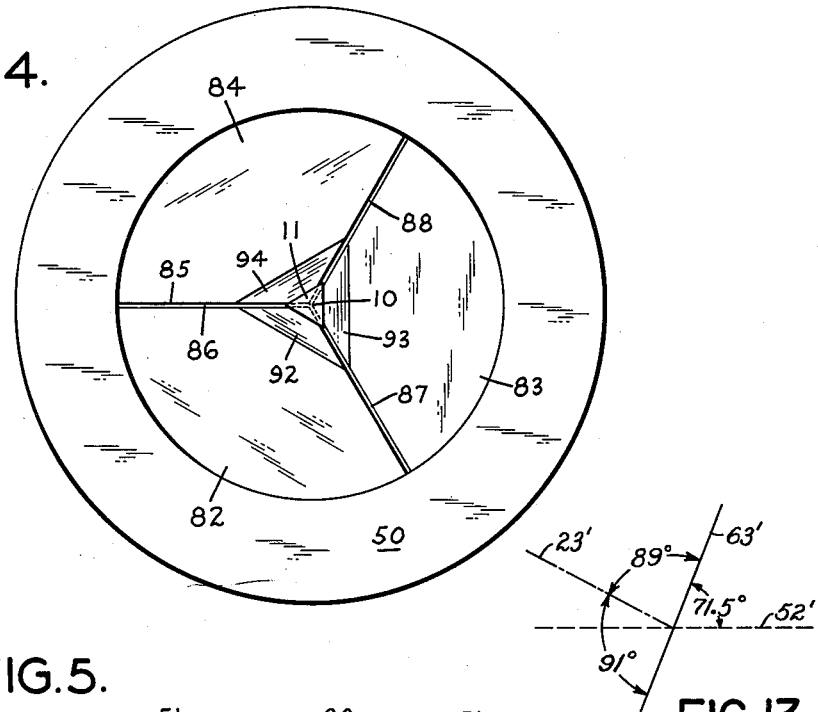
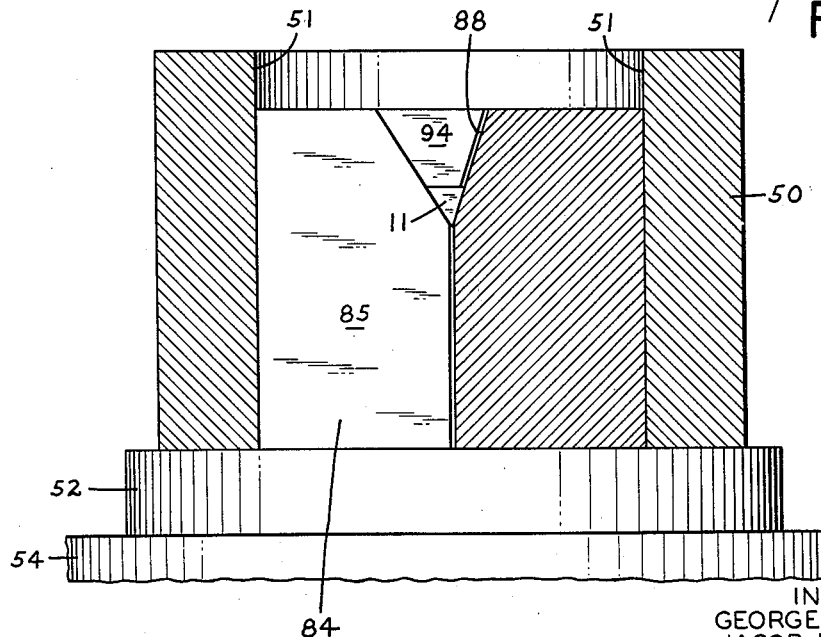

Oct. 8, 1963 G. GERARD ETAL 3,105,994
PRESSURE APPARATUS
Filed Aug. 13, 1959 5 Sheets-Sheet 3

INVENTORS
GEORGE GERARD
JACOB BRAYMAN
BY Brumbaugh,
Free, Graves + Donohue
THEIR ATTORNEYS Oct. 8, 1963    G. GERARD ET AL    3,105,994
PRESSURE APPARATUS
Filed Aug. 13, 1959    5 Sheets-Sheet 4

INVENTORS
GEORGE GERARD
JACOB BRAYMAN
BY Brumbaugh,
Free, Graves + Donohue
THEIR ATTORNEYS Oct. 8, 1963   G. GERARD ET AL   3,105,994
PRESSURE APPARATUS
Filed Aug. 13, 1959   5 Sheets-Sheet 5

INVENTORS
GEORGE GERARD
JACOB BRAYMAN
BY
THEIR ATTORNEYS

United States Patent Office 3,105,994
Patented Oct. 8, 1963

3,105,994
PRESSURE APPARATUS
George Gerard, Yonkers, and Jacob Brayman, Staten Island, N.Y., assignors to Barogenics, Inc., a corporation of New York
Filed Aug. 13, 1959, Ser. No. 833,809
6 Claims. (Cl. 18—16)

This invention relates to apparatus for producing high pressure on an object, and, more particularly, to apparatus of this sort wherein such high pressure is produced by a plurality of anvils acting on the object.

A tetrahedral multiple-anvil press is disclosed in an article by H. T. Hall entitled, "Some High-Pressure, High Temperature Apparatus Design Considerations: Equipment for use at 100,000 atmospheres and 3000° C.," published at pages 267–275, volume 29 of The Review of Scientific Instruments (1958). In the Hall type of press, a sample or specimen to be compressed is encased by a body of buffer material which is externally shaped to be in the form of a regular tetrahedron. The sample alone may be inserted into the tetrahedron or, alternatively, may be contained within a metal tube or cylinder which in turn is inserted within the tetrahedral body. When a containing cylinder is used, electrical connections may be made to the cylinder (for electrical heating or measuring purposes) by metal strips which extend from the cylinder to the surface of the tetrahedral body to provide respective electric terminals in the form of metal tabs lying flat on the separate faces of such body.

The buffer material of which the tetrahedron is composed is characterized by high wall friction and by its ability to become plastic or semi-plastic under high applied specific pressures and thereby transmit such pressure throughout its mass. One such suitable material is the natural mineral pyrophyllite.

Each of the four faces of the tetrahedral pyrophyllite body is contacted by the smaller end of one of four wedge-shaped anvils. The anvils are aligned to have their center lines of action coincide with the four axes of the tetrahedron which are at right angles to the faces thereof, and which pass through the centers of such faces to insersect at the center of the tetrahedron.

In the operation of the Hall press, all of the anvils are simultaneously driven inwardly against the tetrahedron under pressure applied to their larger outer ends. Each anvil acts as a pressure multiplying device in that the pressure exerted by its inner end exceeds the pressure applied to its outer end by a multiple which is approximately of the same value as the ratio of the area of the outer end to the area of the inner end. Hence, under suitable applied pressure, the anvils are capable of exerting a pressure of, say, 100,000 atmospheres upon the tetrahedron and upon the sample encased thereby.

In the Hall type of apparatus, each anvil is driven against the tetrahedral body by a force which is independent of and comes from a separate source than the forces which are respective to and which drive the other anvils. Consonant with this, the press employed by Hall to actuate his anvils is of a particular design wherein (1) the four anvils are each separately driven by one of four hydraulic rams, (2) a special tetrahedral frame is employed to mount the four ram-and-anvil units in suitable disposition to compress the central tetrahedral body and, (3) the driving actions of the rams are externally synchronized to assure simultaneous and equal inward movements of all anvils.

It has recently been suggested by others than ourselves that the Hall apparatus could be improved upon by providing a multiple-anvil arrangement which is capable of being actuated by the plates of a conventional heavy duty press. The arrangement which has been specifically proposed (and which is not part of the present invention) is that of four anvils in a tetrahedral disposition in which the axis of the first anvil is aligned with the direction of separation of the plates of the press and is driven by the upper plate against the central tetrahedral body, and in which the second, third and fourth anvils are surrounded by a restraining ring which is coaxial with the first anvil, and which rests upon the lower plate of the press.

As another feature of the arrangement, the inner wall of the ring has a diminishing conical taper from top to bottom, and the rear faces of the second, third, and fourth anvils are each backed by this inner wall to be slidable thereover. The driving of the first anvil against the tetrahedral body produces a downward displacement thereof which is transmitted to the three other anvils to cause downward sliding of their rear faces over the inner wall of the ring. Because of the conical taper of this wall, the result of such downward sliding is to wedge the last-named anvils against the tetrahedral body to produce simultaneous compression thereof by all four anvils.

One disadvantage of the above-described arrangement is that there is no configuration which can be imparted to the rear faces of the second, third and fourth anvils which will permit the curvature of each such face to match (i.e., be concentric with) the curvature of the opposite area of conically tapered wall at all points in the range of downward displacement of the mentioned anvils. While such match can be obtained at one selected point in that range, at all other displacement points only a line contact is obtained between the wall and the rear faces of the mentioned anvils.

When there is only a line contact, stress can be communicated between anvil and wall only over a relatively small area in which the stress has a non-uniform density, and which varies in size with the vertical positioning of the anvil. As a result, the anvils are robbed of much of their potential effectiveness as pressure multiplying devices, and the second, third and fourth anvils will not act upon the central body in exactly the same manner as the first anvil.

Another disadvantage of the above-described arrangement is that the coupling between the second, third and fourth anvils and the retaining ring is of a type which imparts stress to the ring over a relatively small part of the full periphery thereof. Because of this stress concentration at particular points in the ring periphery, the ring is subject to undue deformation, and, for this reason, is limited in respect to the stresses which it can withstand.

An object of our invention is to provide multiple-anvil apparatus which is capable of being actuated by a conventional press while being free of the above-noted disadvantages. Other objects of our invention are to provide apparatus of this sort which is characterized by one or more of the advantages of stability of alignment of the anvils, simplicity of manufacture and operation, and lowness of cost.

These and other objects are realized through apparatus wherein an object in the form of a regular or irregular polyhedron is compressed by a plurality of anvils. Incorporated in such apparatus is means to translate a driving against the object of at least one of the anvils into wedging actions against the object by others of the anvils in a manner whereby the object is simultaneously compressed by all anvils. Such wedging actions produce axial stresses in the mentioned other anvils.

Those axial stresses are communicated between the wedging anvils and a means which provides a backing for each such anvil, and which has a coupling therewith of a sort to create between anvil and backing means a stress-carrying path of fixed cross-section. By virtue of the constancy of cross-section of such stress-carrying path, the advantage is obtained that the wedging anvils will act with equal effectiveness as pressure multiplying devices all during the operation by which the object is compressed.

In one form of the invention, each wedging anvil has a planar rear face, and the backing means provides behind such rear face a planar slide surface which is parallel to that rear face, and which is adapted to wedge the anvil against the object to be compressed upon displacement of the rear face of the anvil over the slide surface.

In another form of the invention, the wedging anvils may be coupled to the backing means in a manner whereby such anvils are fixedly positioned relative to the backing means during the pressing of the object. In this form wherein the mentioned anvils are stationary relative to the backing means, the wedging effect of the anvils on the object is obtained by a slipping of the object over the front faces of the wedging anvils as the object is displaced relative to those anvils in a direction at a slight inclination to the lie of the front face of each thereof.

In both of the mentioned forms of the invention, the path by which axial stress is communicated between the backing means and each wedging anvil is a path of fixed cross-section.

The most suitable form for the backing means is one which provides a closed frame surrounding the wedging anvils. This closed frame may be comprised of a unitary member which rings the anvils or, alternatively, of a plurality of members which are connected together by joints having the property of precluding or reducing the transmission of moments from one member to another. Whatever the form of the frame, it is desirable to couple the wedging anvils thereto in such manner that the axial stress in each anvil is distributed over a substantial extent of the periphery of the frame. In this way, there is avoided the disadvantage of undue deformation or breaking of the frame as a result of high concentrations of stress induced therein.

For a better understanding of the invention, reference is made to the following description and to the accompanying drawings wherein:

FIG. 1 is a plan view of an embodiment of the invention in which the wedging anvils slide in relation to the means which backs those anvils;

FIG. 2 is a front elevation, taken partly in cross-section, of the FIG. 1 embodiment;

FIG. 3 is a fragmentary cross-sectional view (taken as indicated by the arrows A—A in FIG. 2) of a detail of the FIG. 1 embodiment;

FIG. 4 is a plan view of another embodiment of the invention in which the wedging anvils remain stationary relative to the means which backs those anvils;

FIG. 5 is a front elevation, taken partly in cross-section, of the FIG. 4 embodiment;

FIG. 12 is a broken-away fragmentary view in a horizontal cross-sectional plane of a detail of the FIG. 1 embodiment; and FIG. 13 is a geometric diagram of the relation in the FIG. 1 embodiment between the axis of one of the anvils and the plane of the surface over which that anvil slides.

Figure 6:
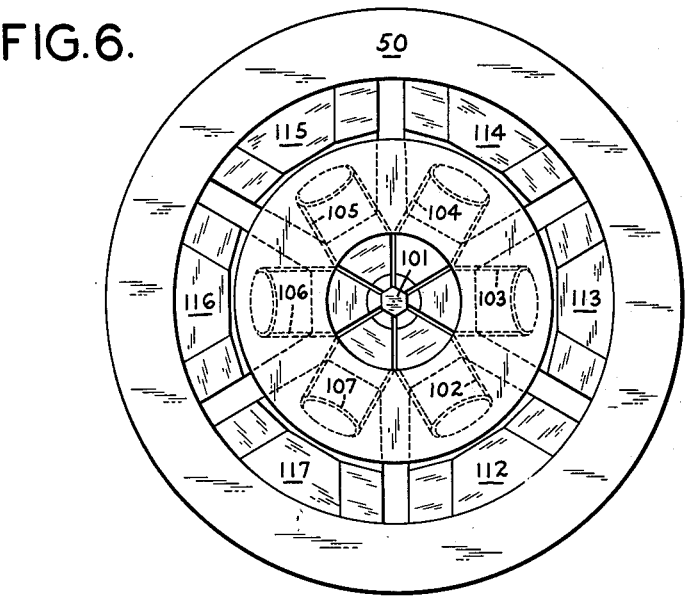
FIGS. 6 and 7 are plan and front elevation views, respectively, of the FIG. 1 embodiment as modified to compress an object having an irregular polyhedral shape.

Referring now to FIG. 1, the numerals 10 and 11 designate, respectively, a sample to be compressed and a body of pyrophyllite which encloses that sample, and which is in the form of a regular tetrahedron. The sample 10 may be inserted in the pyrophyllite body 11 in the manner described by H. T. Hall in the aforementioned article in The Review of Scientific Instruments. Thus, the sample may be inserted alone or may be contained within a metal cylinder (not shown) which in turn is inserted within the pyrophyllite body 11. If desired, electrical connections may be made to the cylinder by silver foil strips (not shown) which extend from the cylinder to the surface of the pyrophyllite body 11 to provide respective electrical terminals in the form of metal tabs lying flat on the separate faces of such body.

The tetrahedral body 11 is disposed in the central chamber of an anvil receiving block 15 which is preferably made of an electrical insulating material. This central chamber is provided in the block by the common intersection of four cylindrical bores formed therein, namely, a vertical bore 16 extending downwardly from the top of the block, and three other bores 17, 18, 19 disposed at 120° intervals about the periphery of the inclined side wall 20 of block 15. The side bores 17, 18, 19 extend from side wall 20 into the block in a direction which is predominantly horizontal, but which has an upward inclination (FIG. 2). The axes of the four bores 16—20 coincide with the four axes of the tetrahedral body 11 which pass at right angles to the faces of such body and through the centers of such faces to intersect at the center of the tetrahedron.

Each of the four bores in block 15 is adapted to receive an anvil. Thus, the bore 16 is adapted to receive therein an anvil 21 (FIG. 2). A plurality of anvils 22, 23 and 24 are shown in FIG. 1 as being received within the bores 17, 18 and 19, respectively. The axes of the four anvils received within block 15 coincide with the described axes of the tetrahedral body 11. The anvils 22 and 24 have substantially the same structure as the anvil 23 whose construction appears in detail in FIG. 2 to which reference is now made.

The anvil 23 includes a hard end piece 25 which is made, say, of cemented tungsten carbide, and which has a truncated front end providing the anvil tip. The anvil also includes a bearing ring 26 and a pressure disk 27, both made of steel. The end piece 25 is received with a hard press fit within a forward bore of the bearing ring 26 which provides lateral support for the end piece. The pressure disk 27 is received with a close fit within a larger rearward bore of the bearing ring 26 to make a contact with the rear end of the hard end piece 25.

The hard end piece 25 of anvil 23 is chamfered at its front at 120° intervals around its periphery to produce a diminishing taper formed by three chamfer faces of which the faces 28 and 29 are shown in FIG. 2. This taper shapes the front contact face 30 of the end piece 25 to be in the form of an equilateral triangle. The edges of this triangle are somewhat less in length than the edges of the equilateral triangle formed by the face of the pyrophyllite body 11 with which the face 30 of end piece 25 is brought into contact. For example, the face 30 of the end piece may measure ½" on an edge, whereas the corresponding face of body 11 may measure 9/16" on an edge. The slanting chamfer planes formed in the front end of end piece 25 are continued out to the cylindrical surface of the bearing ring 26 by chamfering the front end of the bearing ring at 120° intervals and with the same inclination as the chamfers of the end piece.

To the end of guiding the anvil receiving block 15, the block is provided at the bottom with a downstanding stem 40 and at the top with three upstanding pins which are distributed at 120° intervals around the block. Of these three pins, the pins 41 and 43 appear in FIG. 2.

As shown by FIG. 2, the anvil receiving block 15 is positioned within a retaining ring 50 having an inner vertical cylindrical wall 51. This ring 50 rests upon a lower bolster 52 in the form of a cylindrical disk having a central aperture (not shown) which receives in slidable relation the stem 40 downstanding from the block 15. The lower bolster 52 is mounted upon and secured to the lower pressure plate 54 of a conventional hydraulic press which is not shown herein except for its pressure plates.

Above the ring 50 is positioned an upper bolster 60 which is likewise in the form of a cylindrical disk. This bolster 60 is mounted beneath and secured to the upper pressure plate 61 of the mentioned hydraulic press. Formed within the upper bolster 60 are three vertically extending apertures (not shown). These apertures respectively receive in slidable relation to three pins upstanding from block 15.

The underside of the upper bolster 60 engages with the upper or butt face of the vertical anvil 21 which passes into the block 15 through the central vertical bore 16 (FIG. 1). This vertical anvil is generally similar in construction to the predominantly horizontal anvils 22—24. The upper or rear face of the vertical anvil is shaped to make flat contact with the bolster 60.

The predominantly horizontal anvils 22, 23, 24 have, respectively, rear faces 62, 63, 64 (FIG. 1) which are of planar configuration and which each are disposed slightly outwardly of the sidewall 20 of block 15. Separate backings for the rear faces 62, 63, 64 are provided by, respectively the planar slide surfaces 65, 66, 67 which are the front faces of, respectively, three thrust blocks 68, 69 and 70. Each of the thrust blocks 68 and 70 is similar in construction to the thrust block 69.

The rear face of the thrust block 69 is in the form of a vertical cylindrical surface 75 whose curvature exactly matches that of the inner cylindrical wall 51 of the ring 50. The bottom of the thrust block is planar and rests upon the bolster 52 (FIG. 2). The top of the block 69 is formed by a central horizontal planar face 76, and by two end faces 77, 78 which lie to either side of the face 76, and which slope downwardly from that horizontal face. The inner planar face 66 of block 69 is parallel to the planar face 63 at the rear of anvil 23.

To the end of permitting free sliding of the butt faces 62, 63, 64 over the slide surfaces 65, 66 and 67, respectively, a bearing sheet (not shown) of polytetrafluoroethylene (for which the trademark is Teflon) may be inserted between each such butt face and the slide surface by which the butt face is backed. A similar sheet of polytetrafluoroethylene may be inserted between the vertical anvil 21 and the upper bolster 60 which drives that anvil. The mentioned plastic sheets have a twofold purpose. First, in the cast of the sheets inserted between the anvils 22—24 and their corresponding thrust blocks, such sheets serve as an excellent lubricant between the rear faces of the anvils and the slide surfaces of the thrust blocks when those sheets are subjected to the high pressures which are produced in the described apparatus. Second, when all four anvils are backed by plastic sheets, the sheets serve to insulate the four anvils from the other metallic parts of the apparatus. Therefore, the anvils may be used as lead-in or lead-out elements for current or voltage passing through the described terminals on the faces of the body 11.

As an alternative to the attainment of lubrication by plasitc sheets, liquid or solid film lubricants may be inserted between the rear faces of the anvils 22—24 and the slide surfaces of the thrust blocks in order to render those anvils free sliding over those surfaces.

As later described in more detail, the anvils 22—24 are caused to slide downwardly over the slide surfaces 65—67 as a result of a downwardly directed force which originates from the downward pressing of bolster 60 on the vertical anvil, and which is transmitted from this anvil through the pyrophyllite body 11 to the anvils 22—24. Despite the lubrication of those anvils, there remains a small frictional force opposing downward motion of the anvils 22—25 over the slide surfaces 65—67. In order to overcome this frictional force, the force transmitted to each of anvils 22—24 from the pyrophyllite body 11 must be a force having a line of action diverging downwardly by ½ to 1° from the axis of each anvil rather than being coincident with such axis. In order to produce such angular divergence between the axis of each predominantly horizontal anvil and the force impressed thereon from body 11, the inclination to the horizontal of each of the slide surfaces 65—67 is made steeper by about ½° to 1° than the inclination thereof which would be at right angles to the axes of the anvils 22—24. This steeper inclination is provided when the angle made with the horizontal by the slide surfaces is an angle of about 71.5° rather than the 70.5° inclination which each such surface would have if it were to be exactly at right angles to the axis of the corresponding anvil. The angular relation between the axis of anvil 23, its planar slide surface 63 and the horizontal plane are represented by FIG. 13 wherein dot-dash line 23' represents said axis, and wherein dash line 52' and solid line 63' represent the respective lines of intersection of said horizontal plane and said planar slide surface with a vertical plane through said axis. In FIG. 13, the departure in said vertical plane of axis 23' from a 90° relation with line 63' has been exaggerated in order to emphasize that there is such a departure. An angular relation similar to that represented by FIG. 13 exists between the axis of each of anvils 22 and 24 and the respective slide surface for that anvil.

As stated, the planar rear faces 62—64 of anvils 22—24 are each parallel to the corresponding one of the planar slide surfaces 65—67. Hence, the mentioned planar rear faces will also make an angle of about 71.5° with the horizontal. With this angle of inclination, each of the rear faces 62—64 is tipped about 1° from a lie exactly normal to the axis of the anvil on which the rear face is formed. By way of contrast, the rear face of the vertical anvil (not shown) is exactly normal to the axis of that anvil.

The described apparatus is operated by actuating the conventional hydraulic press (of which only the pressure plates 54, 61 are shown) to advance the upper plate 61 under pressure towards the lower plate 54. This pressure is transmitted through bolster 60 to the vertical anvil (not shown) to drive this anvil into the block 15. As the vertical anvil drives inwardly it presses against the top face of the tetrahedral body 11 of which the other three faces are contacted by the front faces of anvils 22—24. Hence, the pressure exerted by the vertical anvil on pyrophyllite body 11 is transmitted through this body to the other three anvils 22—24. More specifically, the vertically directed force exerted by the vertical anvil on body 11 is translated into three equal component forces of which each component force acts upon a respective one of the anvils 22—24 in a direction which (subject to the mentioned divergence of ½ to 1°) corresponds to that of the axis of the anvil. The axially directed forces in the anvils 22—24 set up axial stresses therein.

The downward movement of the vertical anvil serves to produce both downward displacement of block 15 within ring 50 and downward sliding of the anvils 22—24 along their respective slide surfaces 65—67. As the anvils 22—24 so slide downwardly, the inclinations of the slide surfaces 65—67 develop wedging reaction forces which displace anvils 22—24 inwardly toward the pyrophyllite body 11. The combination of the force applied to the vertical anvil and the wedging reaction forces developed by slide surfaces 65—67 causes all four anvils to undergo simultaneous and equal inward movements toward the body 11. Because of the configuration of the described apparatus, all four anvils exert equal pressure on this tetrahedral body.

During the compression action, the block 15 is maintained in up-and-down alignment by the sliding fit of its downstanding stem 40 in the central aperture (not shown) of lower bolster 52 and by the sliding fit of the three upstanding pins of the block in the corresponding holes (not shown) of the upper bolster 60. The lower bolster 52 prevents the bottom of ring 50 from cutting into the lower plate 54 of the hydraulic press. Similarly, the upper bolster 60 prevents the top of the vertical anvil (not shown) from cutting into the upper plate 61 of the press.

By continuing the advancement under pressure of upper plate 61 toward lower plate 54, the pressure on the tetrahedral pyrophyllite body 11 is intensified until the body 11 and encased sample, have been compressed to the desired degree, or until the capacity of the hydraulic press has been reached. During the compression, some of the pyrophyllite in the body 11 extrudes into the interstices between the front faces of the four anvils to form a gasket. The remaining pyrophyllite becomes plastic or semi-platsic to act as an excellent transmitter throughout its mass of the pressure exerted thereon. Hence, the pyrophyllite transmits the pressure from the anvils to the encased sample to subject such sample to very high pressure, as, say, pressure on the order of 125,000 atm.

In the course of the pressing operation, the axial stresses set up in anvil 22—24 are transmitted through their rear faces 62—64 to the thrust blocks 68—70 and to the ring 50, the thrust blocks and ring together acting in FIGURE 1 as the anvil backing means. Inasmuch as each of the rear faces 62—64 is a planar face which at all times, during the downward sliding of anvils 22—24, is parallel to and in abutment over its entire area with an opposite planar area of the corresponding one of the slide surfaces 65—67, the axial stress in each of anvils 22—24 is, at all times, communicated to the means backing the anvil over the whole area of the rear face of the anvil and with substantially uniform density of axial stress within this rear face area. In other words, the axial stress carrying path provided by the coupling between each of anvils 22—24 and the anvil backing means is a path which is of fixed cross section at all times during the operation of compressing the pyrophyllite body 11. The section of this path within the rear end portion of the anvil is characterized by a cross-anvil area (i.e., area of the anvil's rear face or of a cross section of the rear end portion) which remains constant in size and larger than the front face area of the anvil all during the pressing operation. As stated, the axial stress which passes through this cross-anvil area is of substantially uniform density over the area.

Moreover, since the anvils 22—24 are coupled to the inclined slide surfaces of the thrust blocks through planar interfaces, the anvils are unable to rock on those surfaces as such anvils would be able to do if they were coupled to those surfaces only through line contacts. Therefore, stability of relative alignment of the anvils is assured during the pressing of the body 11.

Each thrust block transmits through its bottom to the bolster 52 the vertical component of the force exerted on the thrust block by the anvil which is coupled thereto. The horizontal component of this force is transmitted from the thrust block to the retaining ring 50 through the cylindrical interface between the inner wall of the ring and the cylindrically curved rear of the thrust block. Since this interface is vertical, it is unable to communicate vertically directed shearing stress. Hence, the vertical component of the anvil force is unable to produce shearing stress in the retaining ring.

It will be noted from FIGURE 1 that the rear face area of each thrust block is substantially greater than the rear face area of the anvil which is coupled to the block. By virtue of this feature, the block is adapted to act as a stress attenuator in that the axial stress lines passing through the anvil's rear face will diverge within the body of the block to provide less density of stress lines at the rear of the block than at the rear of the anvil. This diminution of stress densities by the design of the block is, of course, advantageous since it aids avoidance of the development in the retaining ring of high stress concentrations which would tend to deform or damage the ring.

Another factor assisting in avoidance of such high stress concentrations is the high percentage of the total periphery of inner wall 51 of ring 50 which is occupied by the bases or rear end portions of the three thrust blocks. As shown in FIGURE 1, the rear faces of the thrust blocks take up well over half the full periphery of inner wall 51. Hence, the stresses developed by the anvils acting against the thrust blocks are widely distributed over the periphery of ring 50 to thereby minimize deformation thereof and to increase the values of the forces by which the anvils 22—24 can act outwardly without causing failure of the retaining rings.

While FIGURES 1 and 2 show anvil retaining means in the form of a unitary member which is a ring, the anvil retaining means may be of another form in the FIGURE 1 embodiment and in the other embodiments described herein. For example, a suitable anvil retaining means is provided by three similar rigid plate members which are connected together to form a jointed frame in the shape of an equilateral triangle. The legs of the triangle are provided by the three plate members or "cross heads" while the vertices of the triangle are provided by pin and clevis joints which act as hinges between adjacent cross heads. A hinged frame of this sort is disclosed in copending United States application Serial No. 804,546 filed April 6, 1959 assigned to the assignee of this application and entitled, "Super High Pressure Apparatus." The advantage of the hinge joints is that they preclude the transmission of moments from one to another of the rigid cross head members of the frame. When the described jointed frame is employed, the rear faces of the thrust blocks 68—70 are made planar to rest against planar surface areas of the three corresponding cross heads.

While the anvil receiving block 15 has been described in detail, this block can be dispensed with. In other words, a block 15 is not needed to maintain four anvils in proper alignment during compressing operations. In the absence of block 15, small plastic (e.g., nylon) spacers in the form of buttons 80 may be inserted as shown in FIG. 12 in the gaps existing between the chamfered faces of the four anvils which are employed. As so inserted, the spacers serve to hold the anvils in tetrahedral disposition prior to a pressing operation. The spacers are of low compressive strength and, hence, are easily flattened during such operation.

The embodiment shown in FIGURES 4 and 5 differs from that shown in FIGURES 1–3 in that the anvils 22—24 and the thrust blocks 68—70 of the earlier described embodiment are replaced in the embodiment of FIGURES 4 and 5 by the anvils 82, 83, 84 which are in the form of cylindrical sectors. Each of those anvils has a vertical cylindrical rear face which matches the curvature of the inner vertical cylindrical wall 51 of ring 50, and which abuts against that wall. Each of the two vertically and radially extending sidewalls of each anvil is separated by a slight gap from the wall adjacent thereto of the adjacent anvil. Thus, the sidewall 85 of anvil 84 is separated by the gap 86 from the opposite side wall of anvil 82. Similarly, the anvils 82, 83 and the anvils 83, 84 are separated by, respectively, the gaps 87 and 88.

The radially inward portion of the top of anvil 82 is chamfered to provide a downwardly sloping front face 92 having the form of an equilateral triangle. The inclination of this front face is the same as that of the corresponding face of the pyrophyllite body 11. The anvils 83 and 84 are similarly chamfered to have provided thereon, respectively, the front faces 93 and 94 which are each in the form of an equilateral triangle, and which each match in inclination the corresponding face of the tetrahedral body 11.

The front faces 92—94 of the anvils 82—84 are disposed in three separate planes which intersect to form a trihedral angle having a downwardly pointing vertex. This same trihedral angle is also defined by the three non-horizontal faces of the pyrophyllite body 11. Consequently, the faces 92—94 of the anvils form a nest which narrows inwardly with approach towards its bottom, and which is matched in shape to the body 11 so that the non-horizontal faces of that body rest flat against corresponding ones of the anvil faces 92—94 when the body 11 is seated in the nest. The presence of the gaps 86—88 renders the nest formed by faces 92—94 open at the vertex of the trihedral angle defined by the plane of those faces and open, also, along the edges of that trihedral angle. The openess of the nest at those places enables the pyrophyllite body 11 to be displaced downwardly relative to the faces 92—94, some of the pyropyllite being extruded by such displacement of flow through the open edges of the nest and to enter the gaps 86—88.

The apparatus of FIGURES 4 and 5 is operated as follows. The tetrahedral pyrophyllite body 11 is seated in the bottom of the described nest in the manner shown in FIGURE 5. Next, the front end of vertical anvil 21 (FIG. 2) is inserted into the nest so that the equilateral triangular front face of this anvil bears against the top equilateral triangular face of the body 11. As already described, the front face of the vertical anvil is somewhat smaller than the face of the body 11 against which it bears. Also, the vertical anvil is dimensioned so that its three chamfered faces will each be parallel to but separated by a gap (similar to gaps 86—88) from a respective one of the faces 92—94 of anvils 82—84 during the pressing to full stroke of the vertical anvil on the body 11. The vertical anvil may be identical in construction with the anvil 23 (FIGURE 2) excepting that the planar rear face of the vertical anvil is exactly normal to the axis thereof, this axis having an exact vertical alignment.

In order to compress the body 11, the rear face of the vertical anvil is pressed downwardly by the bolster 60 (FIGURE 2) to urge the anvil further into the nest. The front face of the vertical anvil thereupon drives the body 11 downward to produce slipping of the non-horizontal faces thereof over the front faces 92–94 of the anvils 82–84. This relative slipping between the body 11 and the anvils 82—84 is possible for the reason that the body 11 is not completely rigid, i.e., some of the pyrophyllite in the body will be extruded into the gaps between the anvils acting thereon. As an aid to promoting such slipping, a lubricant of the sort already described may be employed to facilitate free sliding of the body 11 over the anvil faces 92—94. Inasmuch as the direction of displacement of the body 11 is at an inclination to each of the mentioned anvil faces 92—94, such displacement will cause each of the anvils 82—84 to have a wedging action against the pyrophyllite body. Accordingly, the overall effect of the described operation is to render the body 11 simultaneously compressed by all four anvils, namely the three stationary anvils 82—84 and the moving vertical anvil.

The embodiment of FIGURES 4 and 5 has all the previously described advantages of FIGURES 1–3. An additional advantage of the embodiment of FIGURES 4 and 5 is that its anvils remain stationary relative to the retaining ring 50 during the pressing of the object 11. This stationary character of the wedging anvils aids in attaining the proper relative alignment of those wedging anvils with each other and with the moving vertical anvil during the compressing operation.

Figure 7:
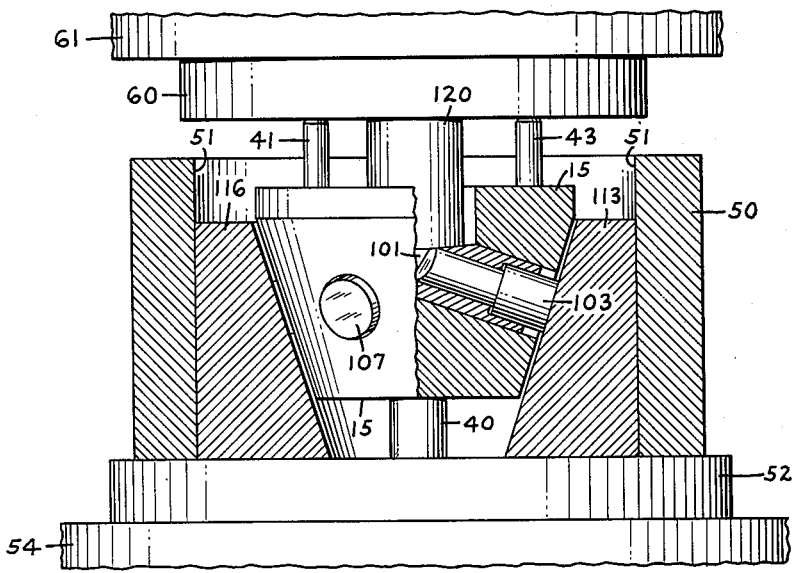

FIGURES 6 and 7 illustrate the embodiment of FIGURES 1–3 as modified to compress an irregular polyhedral pyrophyllite body 101 with an encased sample, (not shown) which is in the form of a six-sided, upside-down pyramid. The top face of body 101 is a horizontal planar face in the form of a regular hexagon. The six non-horizontal faces of the body are in the form of similar isosceles triangles which intersect to form a multihedral angle having a downwardly pointing vertex (not shown).

Corresponding to the mentioned six triangular faces of the pyrophyllite body 101 are six anvils 102—107 and six thrust blocks 112—117 of which each is disposed behind a respective one of the mentioned anvils. Each of anvils 102—107 has a triangular front face which is similar in shape to but slightly smaller than the registering triangular face of the pyrophyllite body 101.

The remaining structure of the apparatus of FIGURES 6 and 7 is the same as the corresponding structure of the apparatus shown by FIGURES 1–3. The operation of the apparatus of FIGURES 6 and 7 will be evident from the description already given of the apparatus illustrated by the FIGURES 1–3. It will be noted that FIGURE 7 shows a vertical anvil 120 received within the vertical bore of the anvil-receiving block 15.

Figure 8:
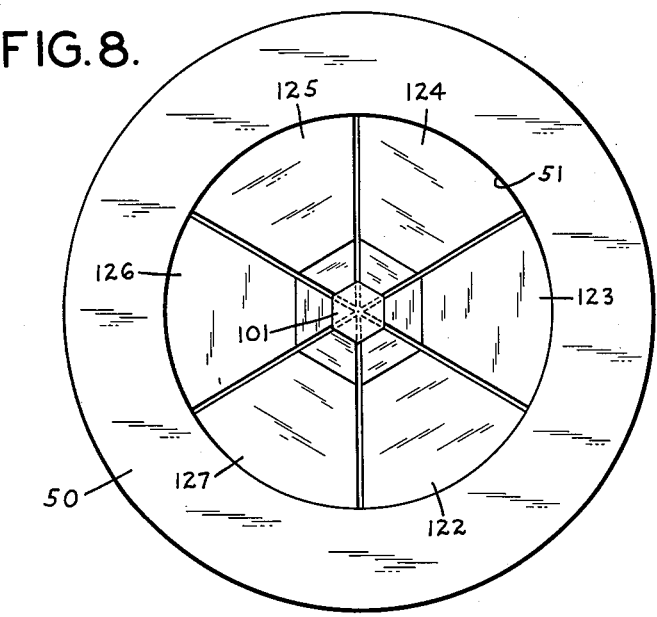
FIGS. 8 and 9 are plan and front elevation views, respectively, of the FIG. 4 embodiment as modified to compress an object having an irregular polyhedral shape.
Figure 9:
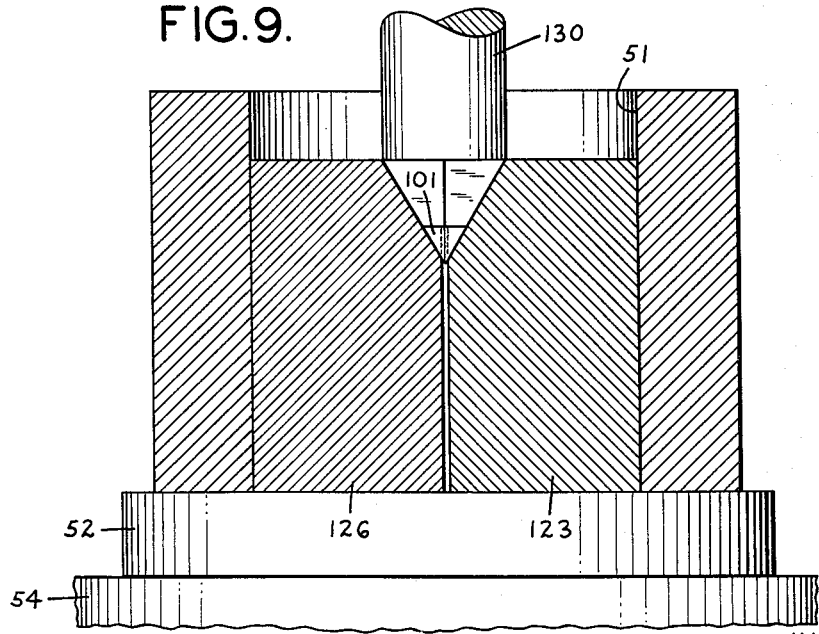

The apparatus of FIGURES 8 and 9 is a modification of the apparatus of FIGURES 4, 5 and bears the same analogy to the last-named apparatus as the apparatus of FIGURES 6, 7 bears to the apparatus of FIGURES 1–3. In the apparatus of FIGURES 8 and 9, the triangular faces of the pyrophyllite body 101 are wedgingly acted upon by six cylindrical sector anvils 122—127 which are essentially similar to the anvils 82—84 of FIGURE 4 excepting that the anvils 122—127 each occupies a smaller circular arc than does each of the anvils 82—84. The front wedging faces of the anvils 122—127 form as before, an open edged nest into which the pyrophyllite body 101 may be seated so that each of the non-horizontal triangular faces thereof is contacted by the triangular wedging face of a respective one of the anvils 122—127. FIGURE 9 shows a vertical anvil 130 disposed within the mentioned nest.

The remaining structure of the apparatus of FIGURES 8 and 9 is the same as the corresponding structure of the appartus of FIGURES 4 and 5. The operation of the FIGURE 8, 9 apparatus will be evident from the description already given of the operation of the FIGURE 4, 5 apparatus.

Figure 10:
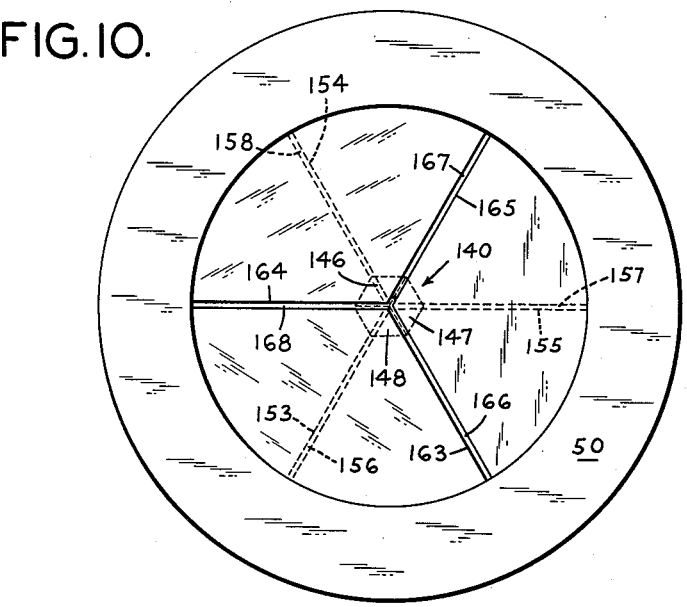
FIGS. 10 and 11 are views of yet another embodiment of the invention.
Figure 11:
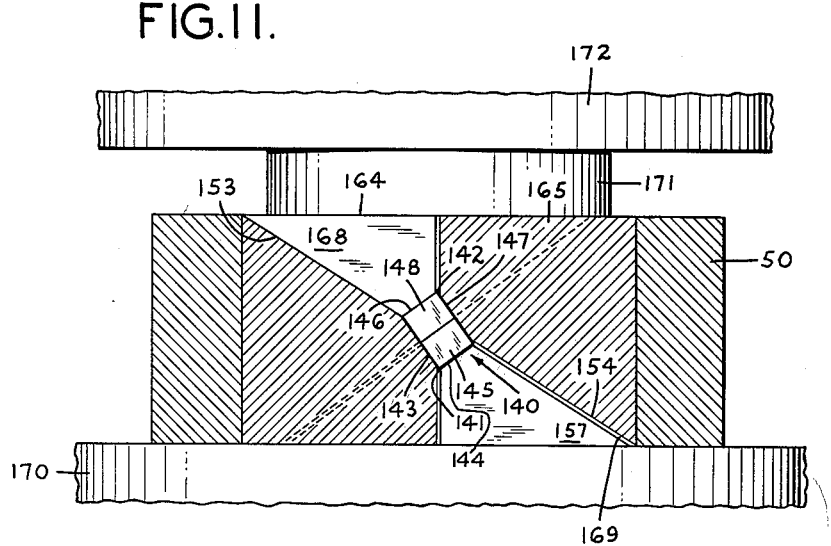

FIGS. 10 and 11 are, respectively, a plan view and a front elevation view of apparatus adapted to compress a pyrophyllite body 140 (encasing a sample, not shown) which is in the form of a cube. The cube 140 is oriented in the apparatus to have a vertex or corner 141 point directly downward, and to have the diagonally opposite vertex or corner 142 point directly upward. In other words, the cube 140 is oriented to render exactly vertical the diagonal connecting the vertices 141 and 142.

The vertex 141 is the vertex of a trihedral angle formed by three faces of cube 140 which are each at right angles to the other two. Of those three faces, the face 143 is seen edge-on in FIGURE 11, one edge of face 144 is seen but the rest of the surface of face 144 is hidden from view, and the full area of the third face 145 is seen at an angle. The remaining three faces 146–148 of cube 140 form a trihedral angle having the point 142 for its vertex. Of those last-named faces, one edge of face 146 is seen while the rest of the surface of face 146 is hidden from view, the face 147 is seen edge-on in FIGURE 11, and the area of the face 148 is seen at an angle.

Each of the three lower faces 143—145 of the cube 140 is contacted by a corresponding one of three lower anvils 153, 154, 155 which (like the anvils 82—84 of FIGURES 4 and 5) are in the form of modified cylindrical 120° sectors occuping the lower half of the interior of retaining ring 50. The anvils 153, 155; the anvils 155, 154; and the anvils 154, 153 are separated from each other by, respectively, the radially and vertically extending gaps 156, 157 and 158.

Each of the anvils 153—155 has formed thereon a front face which is square and which is slightly smaller in size than the corresponding face of the cube 140.

The manner in which this front face is formed in anvil 153 can best be understood by considering that anvil 153 is fabricated from a blank which is in the form of a pie-shaped or cylindrical sector occupying 120° of arc, having horizontal planar bottom and top faces and having at its radially inward termination a vertical edge representing the intersection of the two radially and vertically extending sidewalls of the blank. As a first step, the radially inward top portion of the blank is chamfered to produce a preliminary front face of the same inclination as that shown in FIGURE 11 for the face 143 of cub 140. This preliminary front face is in the shape of an isosceles right triangle having its 90° vertex at the intersection of the downwardly sloping edges of the triangle with the mentioned vertical edge of the blank, and having its two 45° vertices at the respective intersections of the base of the triangle with the two horizontal edges of the blank which are common to the top face of the blank and the two sidewalls of the blank.

Next, the top and the 45° vertices of the isosceles right triangle of the preliminary front face are cut away to make a final front face in the form of a square. This cutting away of the 45° vertices and the top of the triangle is accomplished by chamfering the top of the blank to form two inclined planar chamfer faces extending radially the whole length of the blank. These two chamfer faces intersect the mentioned front face of the blank at two edges which are respective to those chamber faces and which form the two upper sides of the square outlined by the edges of the final front face (the two lower sides of the square being formed by the edges of the front face extending from the already described 90° vertex). Moreover, the two planar chamfer faces intersect each other in an edge or ridge line lying in the vertical plane which bisects the 120° dihedral angle formed by the sidewalls of the blank. This ridge line slopes upwardly from the top vertex of the square front face of the blank to the rear of the blank. The chamfered faces to either side of the ridge line make an angle of 120° with each other in a plane normal to the ridge line.

At this point the mentioned blank has been processed so that the final shape of the anvil 153 has been attained. It will be understood that the above description of manufacturing anvil 153 from a blank is primarily for the purpose of defining the shape of the anvil, and that this shape may be attained in ways other than that described above by way of example.

Each of the other lower anvils 154 and 155 is shaped similarly to anvil 153 to have a square front face. The front faces of all three of the lower anvils 153—155 cooperate to form an open edged nest of the sort previously described in connection with FIGURES 4 and 5. The cube 140 is seated in this nest so that the three lower faces of the cube each bear against a respective one of the front faces of the three lower anvils.

Complementing the three lower anvils are three similarly shaped upper anvils 163—165 which (FIGURE 10) are rotated 60° in relation to the lower anvils. The upper anvils are separated from each other by radially and vertically extending gaps 166—168. The radially inward, bottom portion of each of the upper anvils is chamfered (in a manner alike to that previously described for the lower anvils) to have a front bearing face which is square and parallel to the corresponding one of the upper faces 146—148 of the cube 140, but which is slightly smaller than the corresponding upper face of the cube. Accordingly, the three front faces of the three upper anvils 163—165 form an open edged nest alike to the nest formed by the lower anvils. The upper anvils are separated from the lower anvils by radially extending gaps of uniform width. For example, the upper anvil 165 is separated from the lower anvils 154 and 155 by the gap 169 (FIG. 11). The purpose of these gaps is to permit a downward stroke of the upper anvils relative to the lower anvils. The gaps are formed by the downward projection of the V-shaped section formed by the ridge line (and the chamfered faces to either side thereof) of each upper anvil into the V-shaped groove formed by the two chamfered faces which are under such upper anvil and which belong, respectively, to the two lower anvils which are each half under such upper anvil.

The apparatus of FIGURES 10 and 11 is operated as follows: The retaining ring 50 and the lower anvils 153—155 are placed upon the stationary platen 170 (FIGURE 11) of a conventional press. Next the lower part of cube 140 is placed in the nest formed by the three lower anvils. Subsequently, the three upper anvils 163—165 are placed over the lower anvils to form a nest for the upper three faces of the cube. Nylon spacers (not shown) may be employed between the upper and lower anvils to provide proper spacing therebetween. Finally, the three upper anvils are driven downwardly by a piston 171 which forms part of a conventional press, and which has a lower face adapted to make flat contact with the top faces of the three upper anvils. This piston 171 is mounted to and secured beneath the upper moving platen 172 of the conventional press.

Part of the downward motion of the three upper anvils is communicated to the pyrophyllite cube 140 to cause the three lower faces of this cube to slip over the corresponding front faces of the three lower anvils. As described in connection with FIGURES 4 and 5, this slipping produces wedging actions by lower anvils 153—155 on the lower faces 143—145 of the cube. The part of the downward motion of the upper anvils which is not communicated to cube 140 is taken up by the slipping of the upper faces 146—148 of this cube over the front faces of the upper anvils, and this latter slipping will cause the upper anvils to wedge the upper faces of the cube in the same way as the lower faces thereof are wedged by the lower anvils. Accordingly, the overall effect of the downward driving of piston 171 is to render all six faces of the cube 140 simultaneously compressed by the six anvils of the described apparatus.

The above-described embodiments being exemplary only, it will be understood that the invention comprehends embodiments differing in form and/or detail from those specifically described. For example, if desired, the wedging anvils enclosed by the retaining ring may be connected thereto by key and slot couplings which fix the angular positions of the wedging anvils (to thereby simplify the matter of obtaining proper angular alignment thereof prior to a pressing operation), but which permit the wedging anvils to move freely in the vertical direction (to thereby preclude communication of shearing stress to the retaining ring). The invention is evidently applicable for the compression of objects in the shape of, say, a regular octahedron or some other shape different from that of the object shapes specifically described. Accordingly, the invention is not to be considered as limited save as is consonant with the scope of the following claims.

We claim:

1. Apparatus for compressing a body encased in a cube of buffer material characterized by high wall friction and by the ability to become at least semi-plastic under pressure to transmit pressure therethrough to said body, said apparatus comprising an array of three lower anvils disposed around a vertical axis for said array at 0°, 120° and 240° in relation to a horizontal plane to partly enclose a central cavity in the shape of an up-ended geometric cube matching in size said cube of buffer material and having lower and upper vertices both on said axis, said three anvils each being spaced quiescently and operably by an open gap from each of the two adjacent thereto, and said three anvils having respective rear faces and, also, respective, square, congruent front faces presented towards said cavity to define the three lower face planes of the cubic shape thereof and to form at the bottom thereof an open-edged trihedral nest, an array of three upper anvils having respective rear faces and, also, respective square front faces alike to those of said lower anvils and each being similarly separated by an open gap from each of the two adjacent thereto, said upper anvil array being coaxially above and spaced from said lower anvil array with the upper anvils being at 60°, 180° and 300° in relation to said horizontal plane, and the front faces of said upper anvils defining the three upper face planes of the cubic shape of said cavity and forming at the top thereof an open-edged, upside-down trihedral nest, hollow anvil retaining means containing said anvil arrays and quiescently receiving the rear faces of said anvils in bearing relation on wall portions of the interior thereof, and a pair of axially spaced members disposed on opposite sides of said anvil arrays and relatively movable towards each other to displace said arrays towards each other, said apparatus being adapted by said displacement to compress said body when said cube of buffer material is fitted into said cavity by transmitting pressure from said anvils through said material to said body.

2. Apparatus for compressing a body encased in a block of buffer material characterized by high wall friction and by the ability to become at least semi-plastic under pressure to transmit pressure therethrough to said body, said apparatus comprising, an array of at least three lower, pressure multiplying anvils in quiescently and operably stationary relation with each other and disposed around a vertical axis for said array to partly enclose a central cavity of which the bottom is in the shape of a downwardly pointing multihedral angle, said anvils being each spaced quiescently and operably by an open gap from each of the two adjacent thereto, and said anvils having respective, rear faces and, also, respective planar polygonal front faces of which each has two downwardly sloping converging margins, and of which each defines a respective one of the face planes of said angle, the front faces of said anvils together forming a downwardly narrowing nest of the shape of said angle and having open edges formed by such open gaps and an open vertex at the intersection of said edges, hollow anvil-retaining means containing said anvil array and quiescently receiving the rear faces of said anvils in bearing relation on wall portions of the interior thereof, anvil support means extending transversely of said axis between said anvil array and said anvil-retaining means to preclude downward displacement of the former relative to the latter, and axially movable, pressure multiplying, upper anvil means disposed above said cavity to bound it at the open end of said multihedral angle, said apparatus being adapted by relative closing movement between said upper anvil means and lower anvil array to compress said body when encased in a block of buffer material matching said cavity in size and shape and fitted into said cavity.

3. Apparatus for compressing a body encased in a block of buffer material characterized by high wall friction and by the ability to become at least semi-plastic under pressure to transmit pressure therethrough to said body, said apparatus comprising, an array of at least three lower, pressure multiplying anvils disposed around a vertical axis for said array to partly enclose a central cavity of which the bottom is in the shape of a downwardly pointing multihedral angle, said anvils being each spaced quiescently and operably by an open gap from each of the two adjacent thereto, and said anvils having respective planar polygonal front faces of which each is normal to the axis of the associated anvil and has two downwardly sloping, converging margins, and of which each defines of the face planes of said angle, the front faces of said anvils together forming a downwardly narrowing nest of the shape of said angle and having open edges formed by such gaps and an open vertex at the intersection of said edges, and said anvils also having respective planar rear faces of which each is at a steeper inclination to the horizontal than a plane normal to the axis of the associated anvil, means backing each of said anvils and providing behind the rear face of each thereof a planar slide surface parallel to such rear face and quiescently receiving such rear face in flat bearing relation, the said slide surfaces converging downwardly towards said vertical axis, and the rear faces of said anvils being each slidable downwardly over the slide surface on which such rear face bears, and upper anvil means disposed above said cavity to bound said cavity at the open end of said multihedral angle, said upper anvil means being axially movable relative to and towards said anvil backing means, and said apparatus being adapted by relative closing between said upper anvil means and backing means with accompanying downward sliding of the rear faces of said anvils over their respective slide surfaces to compress said body when encased in a block of buffer material matching said cavity in size and shape and fitted into said cavity.

4. Apparatus for compressing a body encased in a block of buffer material characterized by high wall friction and by the ability to become at least semi-plastic under pressure to transmit pressure therethrough to said body, said apparatus comprising, an array of at least three lower, pressure multiplying anvils horizontally disposed around a vertical axis for said array to partly enclose a central cavity, said anvils being each spaced quiescently and operably by an open gap from each of the two adjacent thereto and said anvils having respective front faces presented towards said cavity and together forming an inwardly narrowing nest defining the bottom of the cavity and having open edges formed by said gaps and an open vertex at the intersection of such edges, said anvils having their axes inclined downwardly in the direction away from said vertical axis and having respective planar rear faces of which each has a steeper inclination to the horizontal than a plane normal to the axis of the associated anvil, anvil retaining means ringing the rear faces of said anvils, a plurality of thrust blocks of which each is interposed between said retaining means and the rear face of respective one of said anvils, and of which each provides behind that rear face a planar slide surface parallel to such rear face and quiescently receiving such rear face in flat bearing relation, the slide surfaces converging downwardly towards said vertical axis, and the rear faces of said anvils being each slidable downwardly over the slide surface on which such rear face bears, and upper anvil means disposed above said cavity to bound it at the open end of said nest, said upper anvil means being axially movable relative to and towards said anvil retaining means and thrust blocks, and said apparatus being adapted by relative closing movement between said upper anvil means and anvil-retaining means with accompanying downward sliding of the rear faces of said anvils over their respective slide surfaces to compress said body when encased in a block of buffer material matching said cavity in size and shape, and fitted into said cavity.

5. Apparatus as in claim 4 in which each thrust block transmits axial stress from the associated anvil to the anvil retaining means through a base of the block which is of larger area than the rear face of the anvil.

6. Apparatus for compressing a body encased in a block of buffer material characterized by high wall friction and by the ability to become at least semi-plastic under pressure to transmit pressure therethrough to said body, said apparatus comprising, an array of at least three lower, pressure multiplying anvils horizontally disposed around a vertical axis for said array to partly enclose a central cavity, said anvils being each spaced quiescently and operably by an open gap from each of the two adjacent thereto, said anvils having respective front faces presented towards said cavity and together forming an inwardly narrowing nest defining the bottom of the cavity and having open edges formed by said gaps and an open vertex at the intersection of such edges, said anvils having their axes inclined downwardly in the direction away from said vertical axis and having respective planar rear faces of which each has a steeper inclination to the horizontal than a plane normal to the axis of the associated anvil, means backing each of said anvils and providing behind the rear face of each thereof a planar slide surface parallel to such rear face and quiescently receiving such rear face in flat bearing relation, the said slide surfaces converging downwardly towards said vertical axis, and the rear faces of said anvils being each slidable downwardly over the slide surface on which such rear face bears, and upper anvil means disposed above said cavity to bound it at the open end of said nest, said upper anvil means being axially movable relative to and towards said anvil backing means, and said apparatus being adapted by relative closing movement between said upper anvil means and backing means with accompanying downward sliding of the rear faces of said anvils over their respective slide surfaces to compress said body when encased in a block of buffer material matching said cavity in size and shape, and fitted into said cavity.

References Cited in the file of this patent

UNITED STATES PATENTS

| | | |
|---|---|---|
| 369,784 | Furman | Sept. 13, 1887 |
| 698,115 | Hird | Apr. 22, 1902 |
| 1,855,855 | Gillis et al. | Apr. 26, 1932 |
| 2,156,459 | Mucher | May 2, 1939 |
| 2,554,499 | Poulter | May 29, 1951 |
| 2,918,699 | Hall | Dec. 29, 1959 |